(12) United States Patent

Legler et al.

(10) Patent No.: US 9,327,471 B2
(45) Date of Patent: May 3, 2016

(54) FLAT COMPOSITE COMPONENT, IN PARTICULAR A VEHICLE BODY PART

(75) Inventors: Dirk Legler, Weil (DE); Adam Wagner, Germering (DE); Frank Kiesewetter, Germering (DE); Michael Koelbl, Neuried (DE); Thomas Peter, Dachau (DE); Jan Wokoeck, Bad Aibling (DE)

(73) Assignee: WEBASTO SE, Stockdorf (DE)

( * ) Notice: Subject to any disclaimer, the term of this patent is extended or adjusted under 35 U.S.C. 154(b) by 723 days.

(21) Appl. No.: 13/504,419

(22) PCT Filed: Oct. 21, 2010

(86) PCT No.: PCT/EP2010/065907
§ 371 (c)(1),
(2), (4) Date: May 30, 2012

(87) PCT Pub. No.: WO2011/054681
PCT Pub. Date: May 12, 2011

(65) Prior Publication Data
US 2012/0231244 A1 Sep. 13, 2012

(30) Foreign Application Priority Data
Nov. 5, 2009 (DE) .......... 10 2009 052 038

(51) Int. Cl.
*B32B 3/12* (2006.01)
(52) U.S. Cl.
CPC ............ *B32B 3/12* (2013.01); *Y10T 428/24942* (2015.01); *Y10T 428/31504* (2015.04); *Y10T 428/31551* (2015.04)
(58) Field of Classification Search
CPC .................................. B32B 3/12; B32B 7/02
USPC ............................................. 428/212, 423.1
See application file for complete search history.

(56) References Cited

U.S. PATENT DOCUMENTS

| | | | |
|---|---|---|---|
| 6,761,953 B2 | 7/2004 | Haas et al. | |
| 7,017,981 B2 | 3/2006 | Strohmavr et al. | |
| 8,042,864 B2 | 10/2011 | Schleiermacher et al. | |
| 2009/0038262 A1* | 2/2009 | Marschke | 52/793.11 |
| 2009/0146463 A1 | 6/2009 | Schleiermacher et al. | |
| 2011/0305869 A1 | 12/2011 | Pollak et al. | |

FOREIGN PATENT DOCUMENTS

| | | | |
|---|---|---|---|
| DE | 3908433 A1 | 9/1989 |
| DE | 10229473 A1 | 6/2003 |
| DE | 10212370 A1 | 10/2003 |
| DE | 10221581 A1 | 12/2003 |
| DE | 10312465 A1 | 10/2004 |
| DE | 10 2007 046 187 A1 | 4/2009 |
| DE | 102009006300 A1 | 7/2010 |
| EP | 1 362 771 A2 | 11/2003 |

OTHER PUBLICATIONS

International Search Report for PCT/EP2010/065907 dated May 16, 2011.

\* cited by examiner

*Primary Examiner* — Bijan Ahvazi
*Assistant Examiner* — Lawrence Ferguson
(74) *Attorney, Agent, or Firm* — Marshall, Gerstein & Borun LLP

(57) ABSTRACT

A flat composite component, in particular a vehicle body part, comprising a material composite having an outer layer, a barrier layer adjoining the outer layer and a carrier structure on which the barrier layer is arranged and which comprises a core which has a first cover layer on the side facing the barrier layer and a second cover layer on the side facing away from the barrier layer. According to the invention, the barrier layer and the carrier structure have thermal expansion coefficients which are selected such that a deformation of the material composite in the case of a temperature change at least largely stops in a range between −50° C. and +80° C.

7 Claims, 2 Drawing Sheets

FLAT COMPOSITE COMPONENT, IN PARTICULAR A VEHICLE BODY PART

BACKGROUND OF THE INVENTION

1. Field of the Invention

The invention relates to a flat composite component, in particular a vehicle body part.

2. Related Technology

A composite component of this type is known from practice in the form of a vehicle roof and comprises a material composite which has an outer layer, which is formed, for example, from a plastic film made of ABS or the like, and a carrier structure. Between the outer layer and the carrier structure, a barrier layer is arranged, which prevents structural features of the carrier structure from being reproduced on the outer layer. The carrier structure has a core which is made from honeycombed paper and which is provided on the side facing the barrier layer with a first covering layer made from a polyurethane/glass fiber mixture and on its side facing away from the barrier layer with a second covering layer made from a polyurethane/glass fiber mixture.

As regards the composite component described above, there is the problem that the individual layers are composed of different materials. This may lead, in the event of a change in temperature, to deformation of the composite component which is attributable to the different lateral expansion behavior of the individual layers of the material composite.

SUMMARY OF THE INVENTION

The invention is based provides a flat composite component of the generic type initially mentioned, in which the risk of deformation of the material composite on account of a change in the ambient temperature is minimized.

Accordingly, the invention provides a flat composite component, in particular a vehicle body part, comprising a material composite with an outer layer, a barrier layer contiguous to the outer layer, and a carrier structure on which the barrier layer is arranged and which comprises a core which is provided on the side facing the barrier layer with a first covering layer and on the side facing away from the barrier layer with a second covering layer, wherein the barrier layer and the carrier structure have coefficients of thermal expansion selected such that deformation of the material composite in the event of a temperature change within a range of between −50° C. and +80° C. is at least largely absent.

According to the invention, therefore, the barrier layer and the carrier structure have coefficients of thermal expansion which are selected such that deformation of the material composite in the event of a temperature change within a range of between −50° C. and +80° C. is at least largely absent.

In the composite component according to the invention, therefore, the coefficients of thermal expansion of the barrier layer and carrier structure are coordinated with one another such that a change in the ambient temperature does not entail any undesirable deformation of a composite component in the form of bulging, warping or the like. Instead, the form of the composite component is essentially maintained over the temperature range claimed. A temperature change consequently also does not entail any deformation which is detrimental to the design or functioning of the composite component.

The composite component according to the invention may, in particular, be designed as a vehicle body part and in this respect be suitable basically for all outer and inner plate-shaped structures of vehicle bodies which may be designed as a composite component. For example, the flat composite component according to the invention is a prefabricated roof module which can be inserted into a correspondingly designed room frame of a vehicle body. However, the body part may also be a moving surface which is used in conjunction with a sliding roof or in the case of a folding top of a convertible vehicle. Basically, however, the composite component according to the invention is not restricted to applications in the automobile sector. On the contrary, its use may be envisaged in all sectors where flat elements of lightweight construction can be employed.

The outer layer of the composite component according to the invention is produced, in particular, by what is known as the in-mold coating method from a coating material which is coupled chemically to the decoupling layer. The outer layer may therefore be what is known as an IMC (In-Mold Coating) lacquer which, when the composite component is being produced in a molding cavity of a die, is sprayed onto a surface delimiting the molding cavity. The material of the barrier layer is subsequently applied to the sprayed-on coating material. When the composite component is pressed in the mold, the materials are cured and make a bond with one another.

In-mold coating is therefore a method in which the lacquering of a plastic molding is carried out directly in the die used for producing the molding. For this purpose, a highly reactive two-component lacquer is introduced into the mold by means of a special technique. The material layer contiguous to the lacquering is then introduced. The result is a component having a finished surface which, depending on the nature of the mold, may be high-gloss to matt and also structured. The outer layer produced by the IMC method preferably has a thickness of between 10 µm and 100 µm. If required, this outer layer, too, can also be lacquered.

It is also conceivable, however, to design the outer layer as an outer skin which is composed of a plastic film made from ABS (acrylonitrile/butadiene/styrene), ASA-PC (acrylate/styrene/acrylonitrile polycarbonate), ASA (acrylate/styrene/acrylonitrile) or PC (polycarbonate).

The carrier structure of the composite component according to the invention preferably has a core which is a honeycomb structure composed of paper, metal or plastic and is provided on both sides with a covering layer made from a glass fiber/polyurethane mixture, which may constitute a stiffening layer. Alternatively, it is also conceivable that the core of the carrier structure is produced from a plastic foam material.

In a preferred embodiment of the composite component according to the invention, the barrier layer of the flat composite component according to the invention is composed of a polyurethane/glass fiber mixture, the coefficient of thermal expansion of which can be set by means of the proportion of fibers in the mixture. However, the barrier layer may also have a layered construction, the individual layers of which are formed partially from a fiber-free polyurethane material and partially from a fiber-containing polyurethane material. A layer of this type constructed from a plurality of individual layers is often also designated as a multi-tec layer.

Depending on the layer construction and on the requirements to be fulfilled by the composite component, the coefficient of thermal expansion of the carrier structure may be higher or lower than the coefficient of thermal expansion of the barrier layer. The corresponding setting of the coefficients of thermal expansion may, in particular, also be dependent on the coefficient of thermal expansion of the outer layer.

The coefficient of thermal expansion of the carrier structure can be coordinated by an appropriate selection of the coefficient of thermal expansion of the first covering layer and of the second covering layer.

Thus, the coefficient of thermal expansion of the first covering layer, that is to say of that covering layer of the carrier structure which faces the barrier layer, may be equal to the coefficient of thermal expansion of the barrier layer or be higher or lower than the coefficient of thermal expansion of the barrier layer. The coefficient of thermal expansion of the second covering layer, that is to say of that covering layer of the carrier structure which faces away from the barrier layer, may correspondingly be equal to the coefficient of thermal expansion of the barrier layer or be higher or lower than the coefficient of thermal expansion of the barrier layer.

As already mentioned above, the covering layers are in each case manufactured preferably from a polyurethane/glass fiber mixture. The respective coefficient of thermal expansion can then be set by means of the fiber proportion in the respective covering layer. As a rule, the coefficient of thermal expansion increases with a decrease in fiber proportion.

In a further special embodiment of the flat composite component according to the invention, a counteracting layer is provided, which is contiguous to the second covering layer, that is to say to that covering layer of the carrier structure which faces away from the barrier layer.

The coefficient of thermal expansion of the counteracting layer, which assists the thermal behavior of the composite component, may correspond to that of the barrier layer.

Alternatively, however, it is also conceivable that the counteracting layer has a coefficient of thermal expansion which is lower or higher than the coefficient of thermal expansion of the barrier layer. The respective setting of the coefficient of thermal expansion depends on the selection of the materials for the outer layer, barrier layer and carrier structure.

Like the barrier layer or decoupling layer, too, the counteracting layer may have a layered construction, the individual layers of which are formed partially from a fiber-free polyurethane material and partially from a fiber-containing polyurethane material.

The variable layered construction of the counteracting layer consequently designed as a multi-tec layer can positively influence the characteristic values of the composite component, particularly in mechanical and thermal terms, and can consequently be used in a managed way for component design. The same also applies to a barrier layer designed as a multi-tec layer.

As a result of the managed selection of the coefficients of thermal expansion of individual layers of the composite component, the thermal behavior of the components can be decisively controlled and optimized. A desired behavior or deformation behavior of the composite component in the event of a temperature change can consequently be set in a managed way.

Further advantages and advantageous refinements of the subject of the invention may be gathered from the description, drawing and patent claims.

BRIEF DESCRIPTION OF THE DRAWINGS

Exemplary embodiments of a composite component according to the invention are illustrated diagrammatically in simplified form in the drawing and are explained in more detail in the following description. In the drawing.

DETAILED DESCRIPTION

Figure 1:
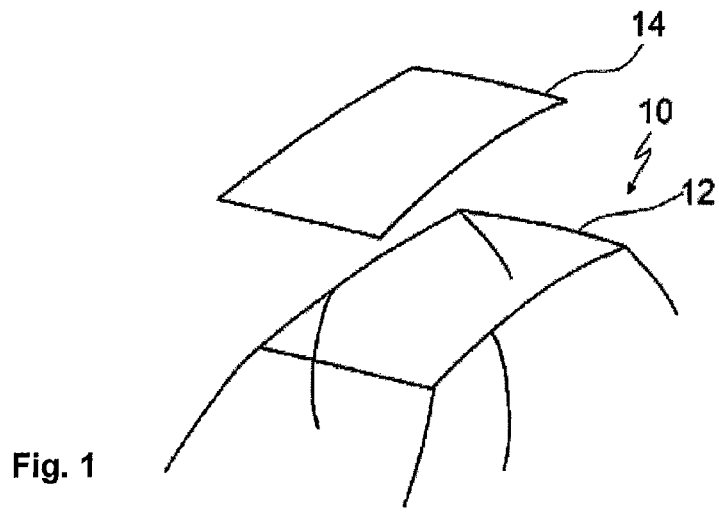
FIG. 1 shows a part view of a passenger car with a roof module.

FIG. 1 illustrates a motor vehicle 10 which is designed as a passenger car and the body of which has a roof frame 12 into which can be inserted a preassembled roof module 14 which is designed as a composite component and which covers a vehicle interior. The connection between the roof module 14 and the roof frame 12 takes place via a peripheral adhesive bead, not illustrated in any more detail here.

Figure 2:
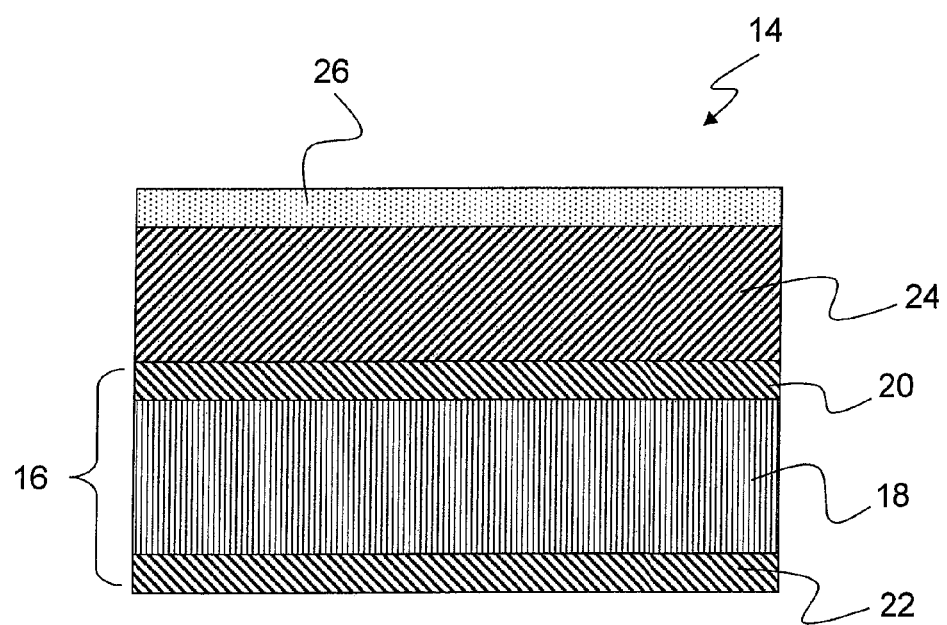
FIG. 2 shows a section through a roof module according to the invention.

FIG. 2 shows a section through the roof module 14 illustrated in FIG. 1, which has a multilayer construction and is prefabricated before being inserted into the roof frame 12.

The roof module 14 designed as a flat composite component forms a material composite having a carrier structure 16 which is composed of honeycombed paper 18 and of a first covering layer 20 arranged on one side of the honeycombed paper 18 and of a second covering layer 22 arranged on the other side of the honeycombed paper 18. The two covering layers 20 and 22 are composed in each case of a polyurethane/glass fiber mixture and serve as stiffening layers for the carrying structure 16.

The first covering layer 20 has arranged on it what is known as a barrier or decoupling layer which is constructed from thin individual layers and which forms what is known as a multi-tec layer. The individual layers of the layered construction of the barrier layer 24 are formed partially from a fiber-free polyurethane material and partially from a fiber-containing polyurethane material.

On the side facing the vehicle outside, the barrier layer 24 carries an outer layer 26 which constitutes the visible face of the roof module 14 and which is formed from what is known as IMC lacquer which is consequently formed on the outside of the roof module 14 during the process of producing the latter.

In an alternative embodiment, the outer layer 26 may also constitute an adhesion promoter layer which is formed during the process and can subsequently be lacquered in a desired coloring.

In the embodiment illustrated in FIG. 2, the carrier structure 16 has a coefficient of thermal expansion which, depending on the selection of material for the outer layer 26, is higher or lower than the coefficient of thermal expansion of the barrier layer 24.

Furthermore, the covering layer 20 of the carrier structure 16 may have a coefficient of thermal expansion which is lower than or higher than the coefficient of thermal expansion of the barrier layer 24. It is also conceivable that the coefficient of thermal expansion of the covering layer 20 is equal to the coefficient of thermal expansion of the barrier layer 24.

That covering layer 22 of the carrier structure 16 which faces away from the barrier layer 24 has a coefficient of thermal expansion which is likewise higher or lower than the coefficient of thermal expansion of the barrier layer 24 or else is equal to the coefficient of thermal expansion of the barrier layer 24.

The coefficients of thermal expansion of the individual layers are set by setting the fiber proportion in the respective polyurethane/glass fiber mixture.

The material composite illustrated in FIG. 2 is produced in such a way that, first, in a molding cavity of a die, a coating material, which in the form of what is known as IMC (in-mold coating) lacquer, is sprayed onto a surface delimiting the molding cavity. A polyurethane/glass fiber mixture forming the barrier layer 24 is subsequently sprayed onto the coating material. The carrier structure 16, which is composed of the honeycombed paper with glass fiber mats arranged on both sides and saturated with polyurethane, is then introduced into the die. After the various component ingredients have been sprayed in or introduced, the die is closed, so that, due to the resulting heating/pressing operation, the polyurethane ingredients and the coating material can be reacted out and the finished composite component forming the roof module 14 is formed. After the composite component has solidified, the die can be opened and the roof module 14 removed. The finished component forming the composite component can then be installed on the respective vehicle without further remachining.

Figure 3:
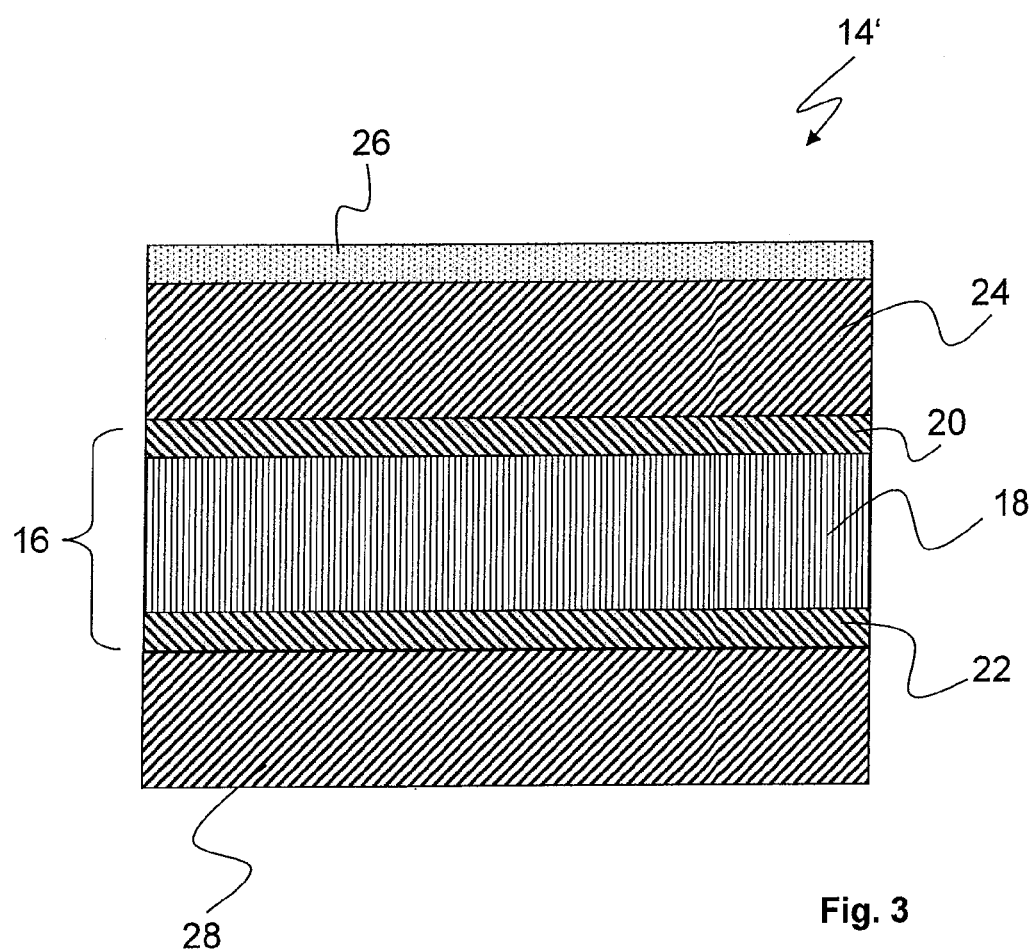
FIG. 3 shows a section through an alternative embodiment of a composite component according to the invention.

FIG. 3 illustrates an alternative embodiment of a composite component 14' which corresponds essentially to that according to FIG. 2, but differs from this in that it has, on the side facing away from the outer layer 26, an additional material layer 28 which constitutes a counteracting layer and which likewise forms a barrier layer. The counteracting layer 28, which may be interpreted as an additional intermediate layer, to which a vehicle inside roof lining subsequently to be applied is adjacent, is likewise formed, correspondingly to the barrier layer 24, from a layered construction of thin individual layers which are formed partially from a fiber-free polyurethane material and partially from a fiber-containing polyurethane material.

The counteracting layer 28 has a coefficient of thermal expansion which corresponds to the coefficient of thermal expansion of the barrier layer 24. Alternatively, for setting a special thermal behavior of the composite component 14', it is also conceivable that the counteracting layer 28 has a coefficient of thermal expansion which is lower or higher than the coefficient of thermal expansion of the barrier layer 24.

LIST OF REFERENCE SYMBOLS

10 Motor vehicle
12 Roof frame
14 Roof module
16 Carrier structure
18 Honeycombed paper
20 Covering layer
22 Covering layer
24 Barrier layer
26 Outer layer
28 Counteracting layer

The invention claimed is:

1. A flat composite component comprising a material composite with an outer layer, a barrier layer contiguous to the outer layer, and a carrier structure on which the barrier layer is arranged and which comprises a core provided on a first side facing the barrier layer with a first covering layer and on a second side facing away from the barrier layer with a second covering layer, wherein the barrier layer and the carrier structure have coefficients of thermal expansion selected such that deformation of the material composite in the event of a temperature change within a range of between −50° C. and +80° C. is absent, the coefficient of thermal expansion of the carrier structure is higher or lower than the coefficient of thermal expansion of the barrier layer, and the barrier layer has a layered construction, individual layers of which are formed partially from a fiber-free polyurethane material and partially from a fiber-containing polyurethane material.

2. The flat composite component as claimed in claim 1, wherein the coefficient of thermal expansion of the first covering layer is equal to the coefficient of thermal expansion of the barrier layer or is higher or lower than the coefficient of thermal expansion of the barrier layer.

3. The flat composite component as claimed in claim 1, wherein the coefficient of thermal expansion of the second covering layer is equal to the coefficient of thermal expansion of the barrier layer or is higher or lower than the coefficient of thermal expansion of the barrier layer.

4. The flat composite component as claimed in claim 1, comprising a counteracting layer contiguous to the second covering layer of the carrier structure.

5. The flat composite component as claimed in claim 4, wherein the counteracting layer has a coefficient of thermal expansion equal to the coefficient of thermal expansion of the barrier layer or higher than or lower than the coefficient of thermal expansion of the barrier layer.

6. The flat composite component as claimed in claim 4, wherein the counteracting layer has a layered construction, individual layers of which are formed partially from a fiber-free polyurethane material and partially from a fiber-containing polyurethane material.

7. A vehicle body part comprising the flat composite component of claim 1.

* * * * *